Feb. 6, 1940. J. T. CLARK Re. 21,342
RUBBER DIAPHRAGM AND METHOD OF MAKING THE SAME
Original Filed March 26, 1937
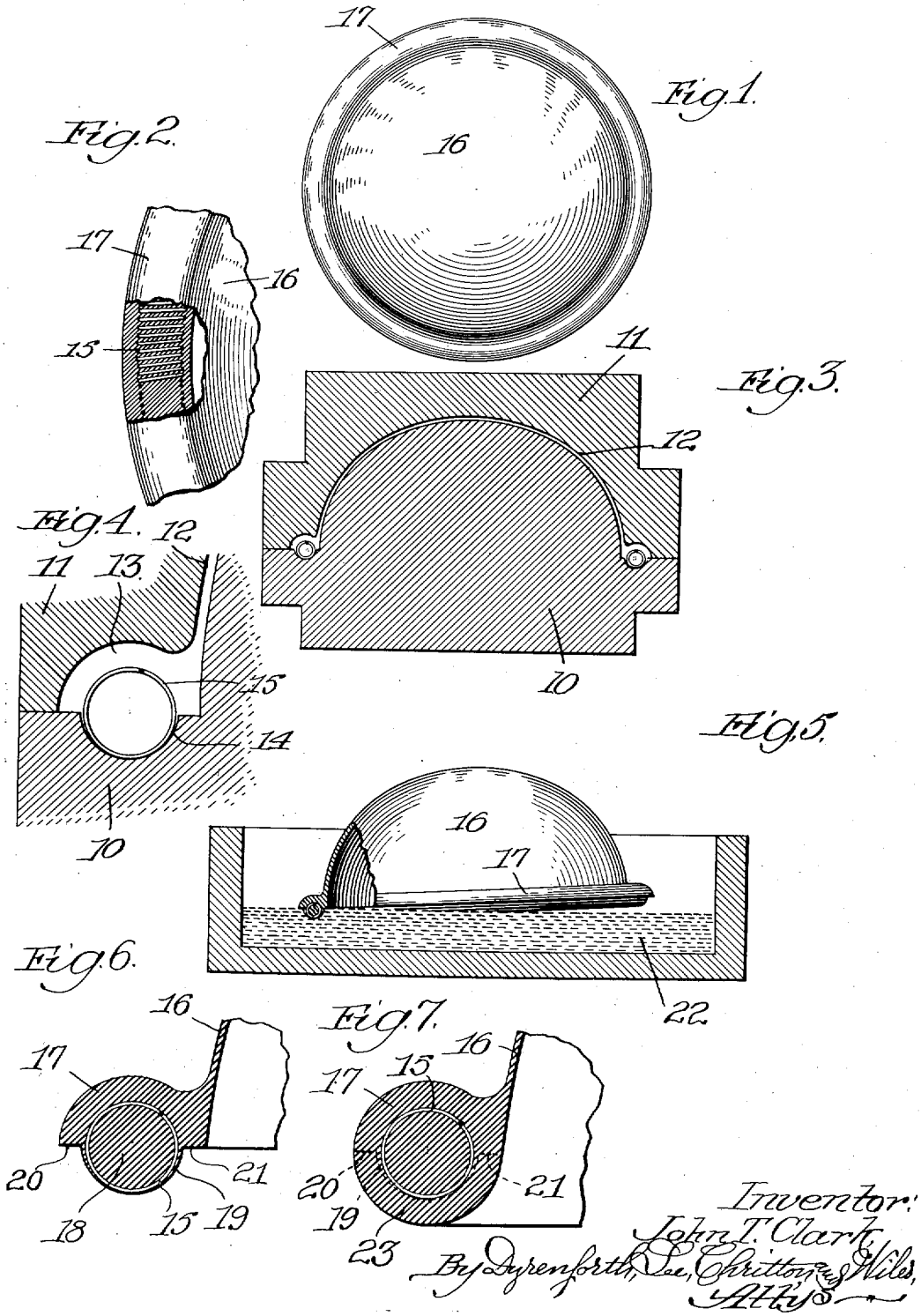
Inventor:
John T. Clark,
By Dyrenforth, Lee, Chritton & Hiles,
Attys.

Reissued Feb. 6, 1940

Re. 21,342

UNITED STATES PATENT OFFICE 21,342

RUBBER DIAPHRAGM AND METHOD OF MAKING THE SAME

John T. Clark, Oak Park, Ill.

Original No. 2,111,313, dated March 15, 1938, Serial No. 133,279, March 26, 1937. Application for reissue September 25, 1939, Serial No. 296,509

8 Claims. (Cl. 18—59)

This invention relates to improvements in pessary or rubber diaphragm and method of making the same. The invention is particularly applicable to hemispherical diaphragms of the occlusive type in which a spiral metal spring is enclosed in the thickened peripheral marginal portion of the diaphragm.

Among the features of my invention, is the making of such a device in which the spring is completely enclosed in rubber and in which the rubber entirely impregnates and fills the inside of the spring.

Another feature of my invention is the making of such a device particularly by molding the rubber, thus forming a more effective union between the diaphragm proper and its periphery.

By the use of molding, the manufacture is greatly facilitated and the completed article is a great improvement over the older devices made by dipping and forming processes.

Other features and advantages of my invention will appear more fully as I proceed with my specification.

In that form of the device embodying the features of my invention shown in the accompanying drawing,—

Fig. 1 is a top plan view;

Fig. 2 is a similar enlarged fragmentary view showing a portion broken away;

Fig. 3 is a vertical sectional view taken through the mold;

Fig. 4 is a similar enlarged fragmentary view;

Fig. 5 is a view showing one of the final steps in the making of the device;

Fig. 6 is an enlarged fragmentary view of a portion of the device showing the same before the last step in the manufacture; and Fig. 7 is a similar view showing the device after completion of the last step.

As shown in the drawing, the mold includes the lower convex member 10 and the upper concave member 11, slightly separated to form a hemispherical space 12 therebetween for the reception of the rubber to make the diaphragm proper.

At the periphery, the upper mold part 11 is provided with a relatively large annular cavity 13, and the lower mold part 10 is provided with a cooperating relatively small annular cavity 14 to hold the spiral spring 15.

In the making of the device, the mold parts are put together, as shown in Figs. 3 and 4, with the spring 15 in place. Rubber is put in the space 12 and also in the space 13, and the mold is suitably filled with rubber in a well known manner and vulcanized, as is well known in the rubber art. The result of these steps in the manufacture is to produce a partially completed diaphragm, as shown in Fig. 6, in which 16 indicates the diaphragm proper of thin rubber with a peripheral partially completed flange or marginal portion 17 having embedded therein the spring 15. The molding and vulcanizing processes have also served to cause the rubber to completely fill the interstices between the convolutions of the spring 15 and the entire interior of the spring. Such rubber in the interior of the spring is indicated by 18. Since the spring has been resting on the bottom of the groove 14 in the mold part 10, it will be seen that the rubber on the bottom of the spring is very thin. In fact, there may be places where the spring shows through on the bottom. In Fig. 6, I have indicated this very thin layer of rubber by reference numeral 19. It will be seen also that the annular cavity 13 in the mold part 11 is considerably wider than the cavity 14 in the mold part 10. Consequently, the thickened rubber cover over the top of the spring 15 terminates in the two shoulders 20 and 21, as shown in Fig. 6.

After completion of the partially formed device, as shown in Fig. 6, I dip the lower half of the spring in liquid rubber or latex 22 until it is covered with rubber 23, as shown in Fig. 7. This rubber is allowed to harden, or may be suitably vulcanized. Before this dipping, the shoulders 20 and 21 and the lower portion of the spring is preferably coated with liquid cement. The dipping is preferably continued until the covering 23 on the under side of the spring is substantially the same thickness as the covering 23 above the spring; that is, until the shoulders 20 and 21 are obliterated. In dipping the device in the liquid latex, as shown in Fig. 5, it is preferably held at a slight slant and then rolled around so that the dipping will be progressive rather than simultaneous throughout the entire circumference to prevent the undue trapping of air.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new and desire to secure by Letters Patent is:

1. The method of making a substantially hemispherical rubber diaphragm with a thickened peripheral marginal portion having a resilient reinforcing member embedded therein, consisting of providing a mold with a space for the diaphragm proper and a peripheral cavity for the reinforcing member, placing the reinforcing member in said cavity resting on the bottom thereof, filling said mold to form the diaphragm proper and cover the reinforcing member except the bottom thereof, and then applying rubber to the bottom of said reinforcing member, by dipping, to completely cover the same.

2. The method of making a substantially hemispherical rubber diaphragm with a thickened peripheral marginal portion having a spiral spring embedded therein, consisting of providing a mold with a space for the diaphragm proper and a peripheral cavity for the spiral spring, placing the spiral spring in said cavity resting on the bottom thereof, filling said mold to form the diaphragm proper and cover the spiral spring except the bottom thereof, and then applying rubber to the bottom of said spiral spring, by dipping, to completely cover the same.

3. The method of making a substantially hemispherical rubber diaphragm with a thickened peripheral marginal portion consisting of first molding the diaphragm proper and the upper part of the thickened marginal portion, said upper part terminating in shoulders, and then completing the thickened marginal portion by dipping until the lower part of the thickened marginal portion is built up even with the shoulders.

4. The method of making a substantially hemispherical rubber diaphragm with a thickened peripheral marginal portion having a resilient reinforcing member embedded therein, consisting of first molding the diaphragm proper and the upper part of the thickened marginal portion to cover the top of the reinforcing member, said upper part terminating in shoulders, and then completing the thickened marginal portion by dipping until the lower part of the thickened marginal portion is built up even with the shoulders and the bottom of the reinforcing member covered.

5. The method of making a rubber diaphragm with a thickened peripheral marginal portion having a resilient reinforcing member embedded therein, consisting of providing a mold with a space for the diaphragm proper and a peripheral cavity for the reinforcing member, placing the reinforcing member in said cavity with a portion of said member in contact with the wall of said cavity, filling said mold to form the diaphragm proper and cover the reinforcing member except the portion thereof in contact with the wall of the cavity, and then applying rubber to the portion of said reinforcing member that was in contact with the wall of said cavity, by dipping, to completely cover said reinforcing member.

6. The method of making a rubber diaphragm with a thickened peripheral marginal portion having a spiral spring embedded therein, consisting of providing a mold with a space for the diaphragm proper and a peripheral cavity for the spiral spring, placing the spiral spring in said cavity with a portion of said spiral spring in contact with the wall of said cavity, filling said mold to form the diaphragm proper and cover the spiral spring except the portion thereof in contact with the wall of the cavity, and then applying rubber to the portion of said spiral spring that was in contact with the wall of said cavity, by dipping, to completely cover said spiral spring.

7. The method of making a substantially hemispherical rubber diaphragm with a thickened peripheral marginal portion consisting of first molding the diaphragm proper and a part of the thickened marginal portion, said part terminating in shoulders, and then completing the thickened marginal portion by dipping until said thickened marginal portion is built up even with the shoulders.

8. The method of making a substantially hemispherical rubber diaphragm with a thickened peripheral marginal portion having a resilient reinforcing member embedded therein, consisting of first molding the diaphragm proper and a part of the thickened marginal portion to cover a part of the reinforcing member, said molded part of the thickened marginal portion terminating in shoulders, and then completing the thickened marginal portion by dipping until the remainder of the thickened marginal portion is built up even with the shoulders and the reinforcing member completely covered.

JOHN T. CLARK.